United States Patent
Stroumbas et al.

(10) Patent No.: US 9,237,611 B2
(45) Date of Patent: Jan. 12, 2016

(54) HOUSING ASSEMBLY FOR ELECTRONIC DISPLAY

(71) Applicants: Peter A. Stroumbas, Palm Beach Gardens, FL (US); Larry J. Wojtowicz, Palm Beach Gardens, FL (US)

(72) Inventors: Peter A. Stroumbas, Palm Beach Gardens, FL (US); Larry J. Wojtowicz, Palm Beach Gardens, FL (US)

( * ) Notice: Subject to any disclaimer, the term of this patent is extended or adjusted under 35 U.S.C. 154(b) by 0 days.

(21) Appl. No.: 14/179,026

(22) Filed: Feb. 12, 2014

(65) Prior Publication Data

US 2014/0160753 A1 Jun. 12, 2014

Related U.S. Application Data

(63) Continuation of application No. 29/410,501, filed on Jan. 9, 2012, now Pat. No. Des. 722,714.

(51) Int. Cl.
*H05B 33/08* (2006.01)

(52) U.S. Cl.
CPC .................................. *H05B 33/0803* (2013.01)

(58) Field of Classification Search
CPC ...... F21V 7/04; G02B 6/0046; G02B 6/0051; G02B 6/0068; G02F 1/133603; G02F 1/133605; G02F 1/133615; H05B 33/0803
USPC ............ 362/474, 235, 249.02, 267, 310, 374, 362/375
See application file for complete search history.

(56) References Cited

U.S. PATENT DOCUMENTS

| | | | | |
|---|---|---|---|---|
| 5,651,606 | A | * | 7/1997 | Krogman ......................... 362/96 |
| 6,305,241 | B1 | * | 10/2001 | Masui et al. .................. 74/551.8 |
| 2010/0061112 | A1 | * | 3/2010 | Li ................................. 362/474 |

* cited by examiner

*Primary Examiner* — Thomas M Sember
(74) *Attorney, Agent, or Firm* — Simpson & Simpson, PLLC

(57) ABSTRACT

A housing assembly for an electronic display including a housing having a top surface, a bottom surface, a rim, and an opening, where the opening is bounded by the rim; and a lens having a top surface, a bottom surface, and a ridge, where the ridge is integral with and extends upwardly from the top surface of the lens forming a space, and where the bottom surface of the housing rests upon the top surface of the lens, and the housing matingly engages the lens, such that the ridge of the lens protrudes upwardly through the opening of the housing. The housing and the lens are convexly-shaped and the bottom surface of the lens is secured to a tubular-shaped member. The housing assembly further includes at least one electronic display disposed within the space formed by the ridge of the lens.

18 Claims, 8 Drawing Sheets

HOUSING ASSEMBLY FOR ELECTRONIC DISPLAY

CROSS-REFERENCE TO RELATED APPLICATIONS

This application is filed under 35 U.S.C. §120 and §365(c) as a continuation of Design patent application Ser.No. 29/410,501, filed Jan. 9, 2012, which application is incorporated herein by reference in its entirety.

FIELD OF THE INVENTION

The invention broadly relates to a housing assembly for an electronic display, and, more particularly, to a housing assembly secured to a tubular-shaped member and includes an electronic display disposed within a space formed therein between the housing assembly and the tubular-shaped member.

BACKGROUND OF THE INVENTION

Electronic displays are well known in the art. Electronic displays present information in a visual form when the input information is supplied as an electrical signal. Electronic displays can be composed of light-emitting diodes (LED), liquid crystals, etc. As many electronic displays include complex and delicate components, if the display is to be used in an environment in which it is exposed to the elements, it would usually necessitate being protected by a housing.

The use of LEDs in electronic displays is becoming more prominent as this type advancements are made in this type of technology. An LED is a two-lead semiconductor light source that resembles a basic pn-junction diode, except that an LED also emits light. When an LED's anode lead has a voltage that is more positive than its cathode lead by approximately 0.6 to 2.2 Volts, current often flows and light is often emitted, On the other hand, when an LED's anode lead has a voltage that is less positive than its cathode lead by approximately 0.6 to 2.2 Volts, current often does not flow and light is often not emitted. LEDs have many advantages over incandescent light sources, including lower energy consumption, longer lifetime, improved physical robustness, smaller size, and faster switching. Additionally, LEDs can be designed to emit photons, which only fall within a certain section of the color spectrum.

LEDs are used in applications as diverse as aviation lighting, automotive lighting, advertising, general lighting and traffic signals, Furthermore, LEDs are often used as indicator lamps for display, low-level lighting applications, such as bicycle signal lights, or for decorative lighting applications, such as handlebars, marine railings and ladders, handrails, brush bars, roof racks, side steps, minors, bumpers, engine compartments, etc.

One problem with prior electronic display housings is that, especially in decorative lighting applications, many housings are bulky and obtrusive and detract from the overall aesthetics of the electronic display. Another problem with prior housings is that many do not allow for proper heat dispersion and dissipation, which is necessary when using a high output LED board without a heat sink.

Thus, there is a long-felt need for a housing that conforms to a surface, having a low profile. There is also a long-felt need for a housing that allows for proper heat dispersion and dissipation without the use of a heat sink when in contact with another surface. There is a further long-felt need for a housing that forms a watertight seal but is also removable and reusable.

BRIEF SUMMARY OF THE INVENTION

The present invention broadly includes a housing assembly for an electronic display having a housing and a lens. The housing has a top surface, a bottom surface, a rim, and an opening, where the opening is bounded by the rim. The lens has a top surface, a bottom surface, and a ridge, where the ridge is integral with and extends upwardly from the top surface of the lens forming a space. The bottom surface of the housing rests upon the top surface of the lens, and the housing matingly engages the lens such that the ridge of the lens protrudes upwardly through the opening of the housing.

In one embodiment, the housing and the lens are both convexly-shaped and the bottom surface of the lens is secured to a tubular-shaped member. Preferably, the lens is removably secured to the tubular-shaped member via a silicone sealant that forms a watertight seal. The housing assembly further includes at least one electronic display disposed within the space formed by the ridge of the lens. The at least one electronic display includes at least one light-emitting diode (LED) and/or an LED board.

In another embodiment, the housing is made of metal, such as stainless steel, brass, aluminum, etc. It is advantageous for the housing to be made of a corrosion resistant material, such as stainless steel, and, more particularly, SAE grade 316 stainless steel. Stainless steel has advantages over other metals in that it does not readily corrode, rust, or stain. SAE grade 316 stainless steel is a marine grade stainless steel. It is especially advantageous in marine environments and surgical applications due to its greater resistance to pitting corrosion. The lens is made of a transparent or translucent material, such as plastic, glass, etc. However, it should be appreciated that the housing and lens can be made of any suitable material known in the art. The diameter of the lens is in the preferred range of ⅞ inch to 3 inches and curves downwardly and around approximately 225° to partially enclose the tubular-shaped member. However, it should be apparent that the lens and housing may vary in size, shape, and dimensions.

In another embodiment, the present invention broadly includes a housing assembly for an electronic display having a housing and a lens, where the lens is integral with the housing to form a single piece. The housing has a top surface, a bottom surface, a rim, and an opening, where the opening is bounded by the rim. The lens has a top surface, a bottom surface, and a ridge, where the ridge is integral with and extends upwardly from the top surface of the lens forming a space. The bottom surface of the housing rests upon the top surface of the lens, and the lens is integral with the housing such that the lens and the housing form a single piece. The ridge of the lens protrudes upwardly through the opening of the housing. The housing and the lens are both convexly-shaped. The housing assembly further includes at least one electronic display disposed within the space formed by the ridge of the lens and the bottom surface of the lens is secured to a tubular-shaped member.

It is a general object of the present invention to provide a housing assembly for an electronic display that conforms to a surface, has a low profile, and aesthetically appealing.

It is another general object of the present invention to provide a housing assembly that allows for proper heat dispersion and dissipation without the use of a heat sink when in contact with another surface.

It is yet another general objection of the invention to provide a housing secured to a tubular-shaped member that forms a watertight seal when in use but is also removable and reusable.

It is yet another general object of the present invention to provide a housing assembly that is corrosion resistant and protects an electronic display that is exposed to natural elements, such as rain, wind, etc.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. Although any methods, devices or materials similar or equivalent to those described herein can be used in the practice or testing of the invention, the preferred methods, devices, and materials are now described.

Unless defined otherwise, all technical and scientific terms used herein have the same meaning as commonly understood to one of ordinary skill in the art to which this invention belongs.

Figure 1:
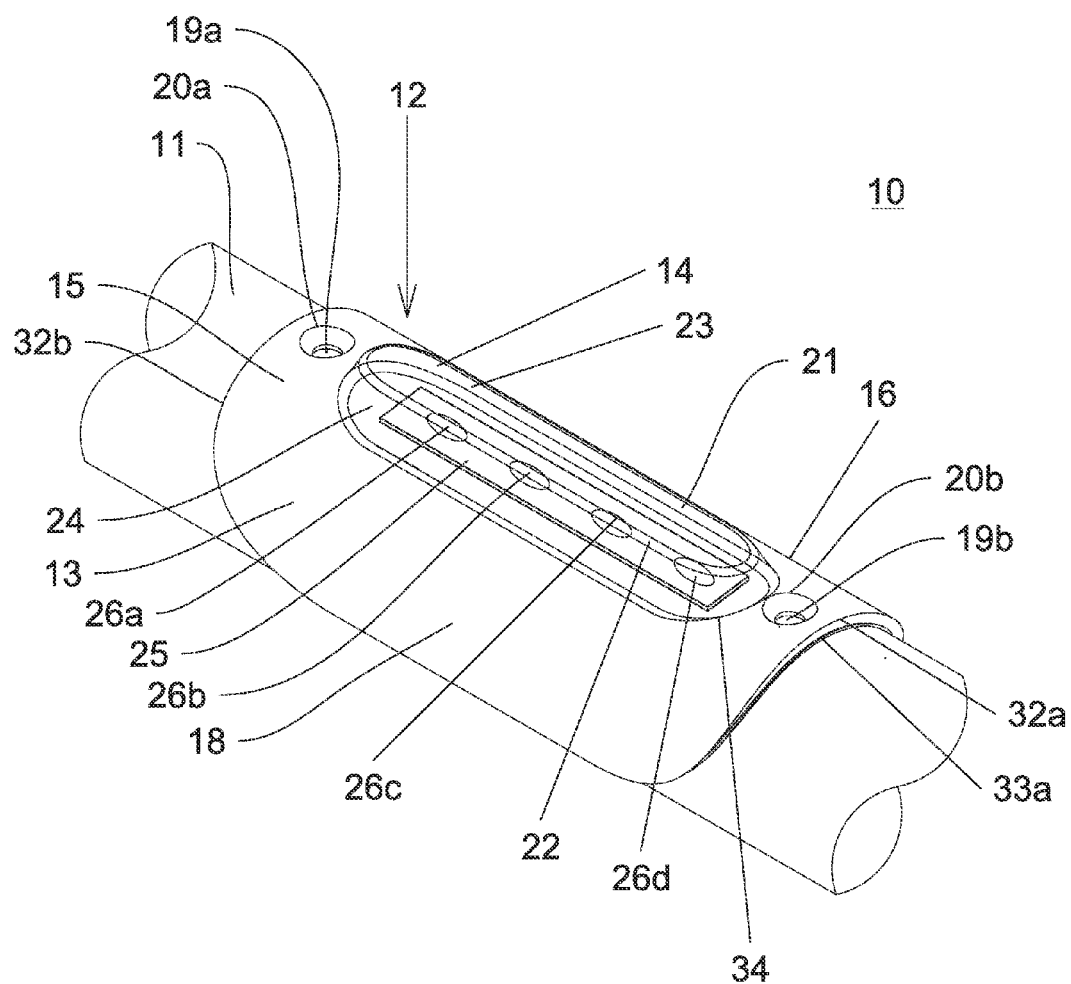
FIG. 1 is a front perspective view of the present invention housing assembly, including an LED display, shown secured to a tubular-shaped member.

Adverting now to the figures, FIG. 1 illustrates the preferred embodiment of the present invention. FIG. 1 is a front perspective view of a combination housing/lens/electronic display assembly, hereinafter referred to as "housing assembly/electronic display" 10. Housing assembly/electronic display 10 broadly includes housing 13, lens 14, and electronic display 25. Combination housing/lens assembly, hereinafter referred to as "housing assembly" 12, is shown secured to tubular-shaped member 11. Preferably, tubular-shaped member 11 is an object such as a handlebar, a marine railing or ladder, a handrail, a brush bars, a roof rack, a side step, etc. However, it should be appreciated that tubular-shaped member 11 can be any suitable object known in the art. It is advantageous for housing assembly 12 to be removably secured to tubular-shaped member 11, and, more particularly, removably secured via a silicone sealant. The silicone sealant provides a watertight seal, while still allowing housing assembly 12 to he removed and reused when not in use.

As shown in the figures, housing assembly 12 includes housing 13 and lens 14. Housing 13 has top surface 15, bottom surface 29, rim 34, and opening 28. Opening 28 is disposed within housing 13 and bounded by rim 34. Lens 14 has top surface 27, bottom surface 30, and ridge 21. Ridge 21 is integral with and extends upwardly from top surface 27 of lens 14 forming a space 31. Bottom surface 29 of housing 13 rests upon top surface 27 of lens 14, forming housing assembly 12. As such, housing 13 matingly engages lens 14 in such a manner that ridge 21 of lens 14 protrudes upwardly through opening 28 of housing 13. Preferably, housing 13 and lens 14 each curve downwardly approximately 225°, and thus, are also convexly shaped. In particular, first side surface 16 and second side surface 18 of housing 13 curve downwardly to form convexly-shaped housing 13. As the housing and the lens each curve to form a convex shape, neither the housing nor the lens curve completely 360° around to form a solid, substantially cylindrical shape. Having the housing assembly "wrap around" the tubular-shaped member adds retention security, while still allowing the housing assembly to be easily removable, when needed. This allows the housing assembly to be more aesthetically pleasing as it has a low profile and is unobtrusive. Ridge 21 of lens 14 includes top surface 22 and first side surface 23 and second side surface 24. In the depicted embodiment, ridge 21 forms a plateau such that top surface 22 is substantially planar and first and second side surfaces 23, 24 are each substantially perpendicular to top surface 22 and extend downwardly from top surface 22 of ridge 21 to and are integral with top surface 27 of lens 14.

As shown in FIG. 1, housing assembly/electronic display 10 includes electronic display 25, which is disposed within space 31 formed by ridge 21 of lens 14 and also rests upon the surface of tubular-shaped member 11. In the depicted embodiment, electronic display 25 is an LED board and further includes LEDs 26a, 26b, 26c, and 26d. The use of LEDs is advantageous because LEDs last substantially longer than other light sources, are energy efficient, durable, can be arranged in a vast array of combinations to produce highly efficient illumination in a variety of colors, and can operate in extreme heat and cold. Preferably, the brightness of the LEDs used in this application is between 200 and 400 lumens. However, it should be appreciated that any form of electronic displays can be used, such as LEDs, liquid crystals, etc., and these displays can take the form of individual lights, or can include gauges, such as gas gauges, speedometers, etc.

As shown in the figures, housing 13 includes first aperture 19*a* and second aperture 19*b*. First aperture 19*a* is bounded by first aperture rim 20*a* and second aperture 19*b* is bounded by second aperture rim 20*b*. Similarly, lens 14 includes first aperture 35*a* and second aperture 35*b*. First aperture 35*a* is bounded by first rim 36*a* and second aperture is bounded by second rim 36*b*. When housing 13 and lens 14 are matingly engaged, first and second apertures 19*a*, 19*b* of housing 13 and first and second apertures 35*a*, 35*b* of lens 14 overlap to provide openings to secure housing assembly 12 to tubular-shaped member 11 via screws, bolts, etc. The contact between electronic display 25 and tubular-shaped member 11 provides a heat sink, such that there is a passive heat exchange that coots electronic display 25 by dissipating heat in space 31 and/or through apertures in tubular-shaped member 11. Apertures disposed within tubular-shaped member 11 also provide a space for wiring from electronic display 25 to connect to a power source, such as a battery, power supply, etc. Housing 13 further includes first end 32*a* and second end 32*b*. Lens 14 further includes first end 33*a* and second end 33*b*. When housing 13 and lens 14 are matingly engaged, first end 32*a* of housing 13 and first end 33*a* of lens 14 are aligned. Similarly, when housing 13 and lens 14 are matingly engaged, second end 32*b* of housing 13 and second end 33*b* of lens 14 are aligned.

Figure 2:
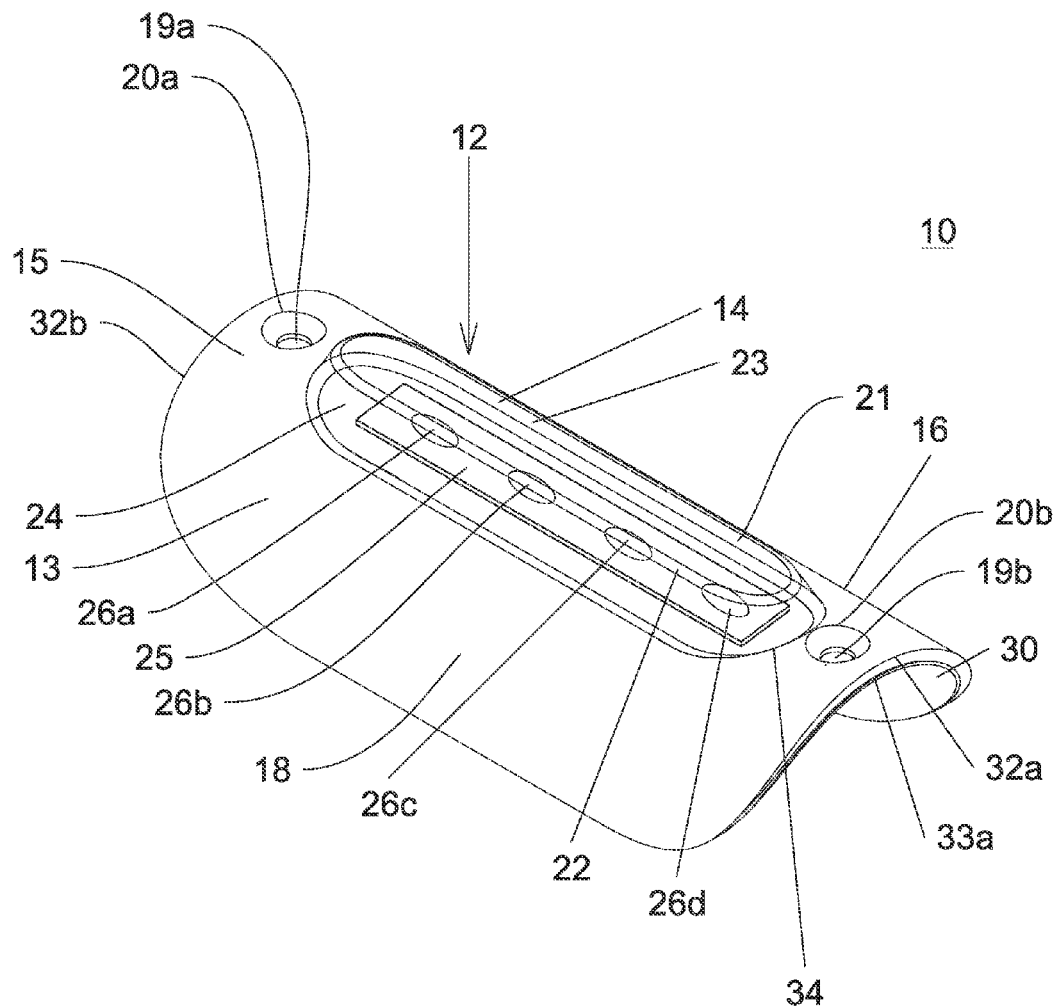
FIG. 2 is a front perspective view of the housing assembly of FIG. 1, shown with the tubular-shaped member removed.

FIG. 2 is a front perspective view of housing assembly/electronic display 10 shown in FIG. 1. However, in this representation tubular-shaped member 11 is removed. Similarly, FIG. 3 is a front perspective view of housing assembly 12, shown with tubular-shaped member 11 and electronic display 25 removed.

Figure 3:
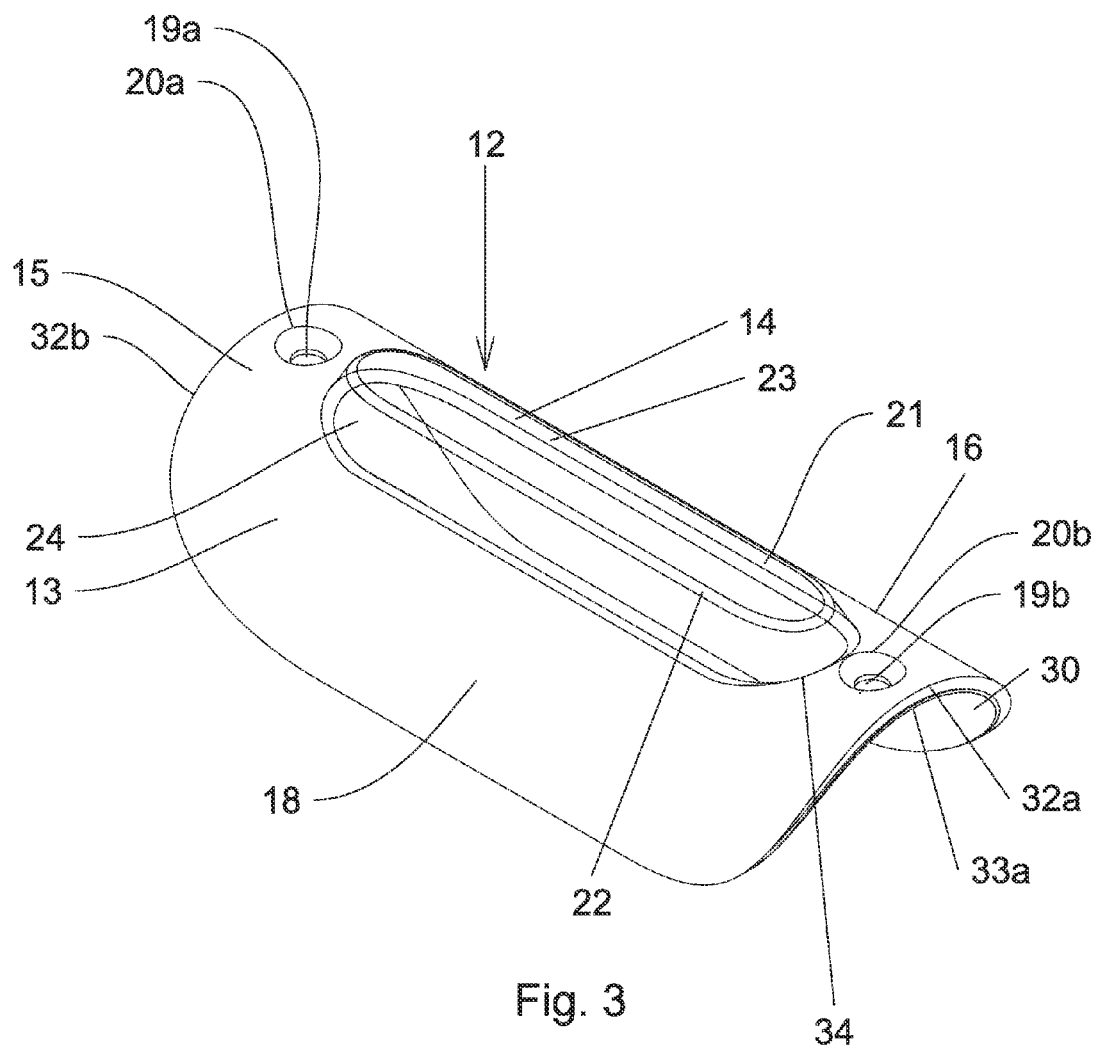
FIG. 3 is a front perspective view of the housing assembly of FIG. 1, shown with the tubular-shaped member and the LED display removed.
Figure 4:
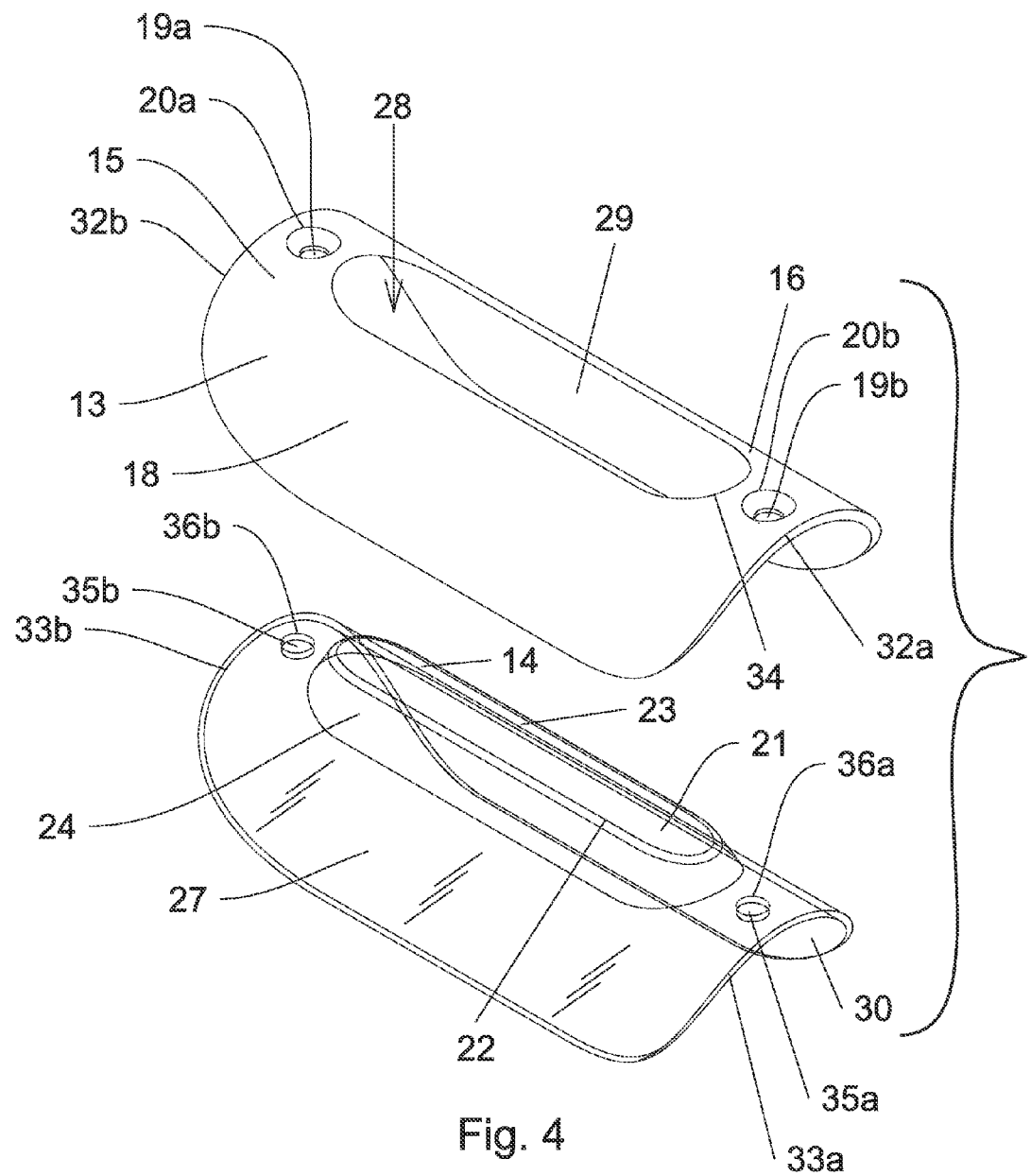
FIG. 4 is an exploded view of the housing assembly of FIG. 3.

FIG. 4 is an exploded view of housing assembly 12 of FIG. 3, showing housing 13 and lens 14 separated from one another.

Figure 5:
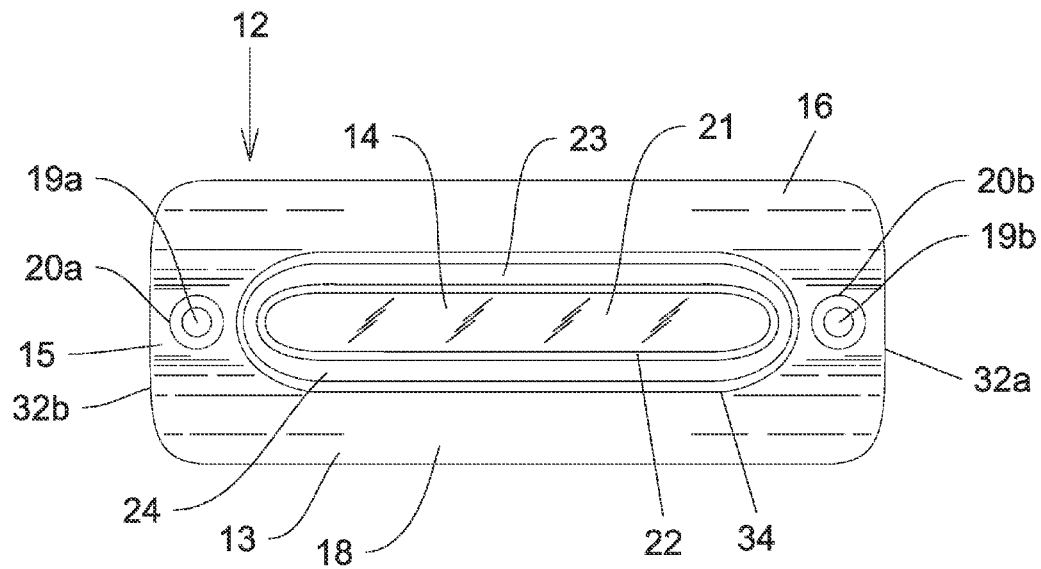
FIG. 5 is a top plan view of the housing assembly of FIG. 3.
Figure 6:
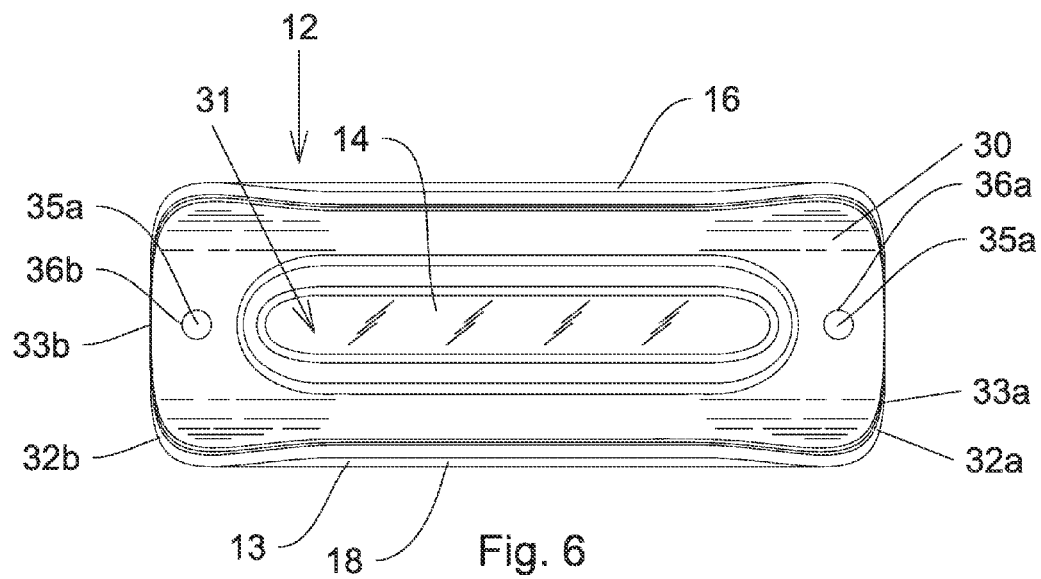
FIG. 6 is a bottom plan view of the housing assembly of FIG. 3.

FIG. 5 is a top plan view of housing assembly 12 and FIG. 6 is a bottom plan view of housing assembly 12.

Figure 7:
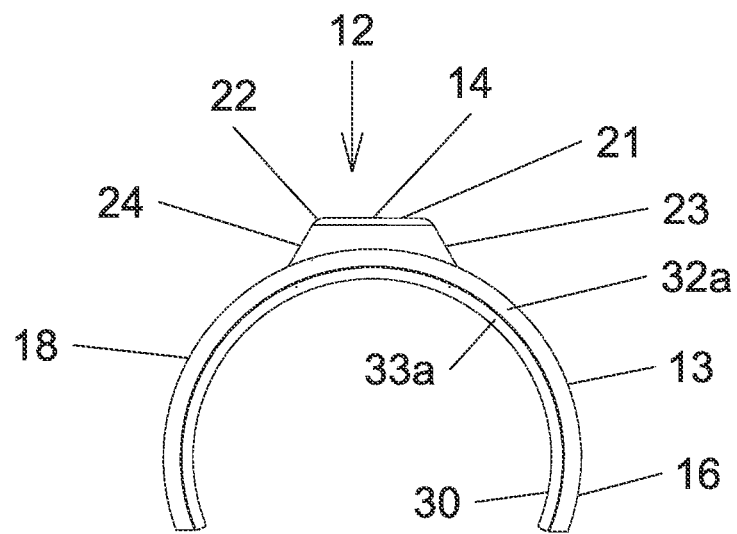
FIG. 7 is a right side elevational view of the housing assembly of FIG. 3.
Figure 8:
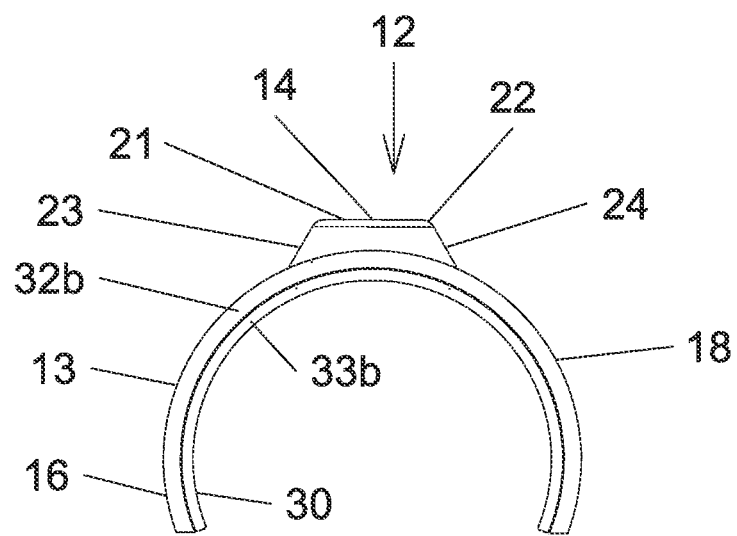
FIG. 8 is a left side elevational view of the housing assembly of FIG. 3.

FIG. 7 is a right side elevational view of housing assembly 12 and Figure FIG. 8 is a left side elevational view of housing assembly 12.

Figure 9:
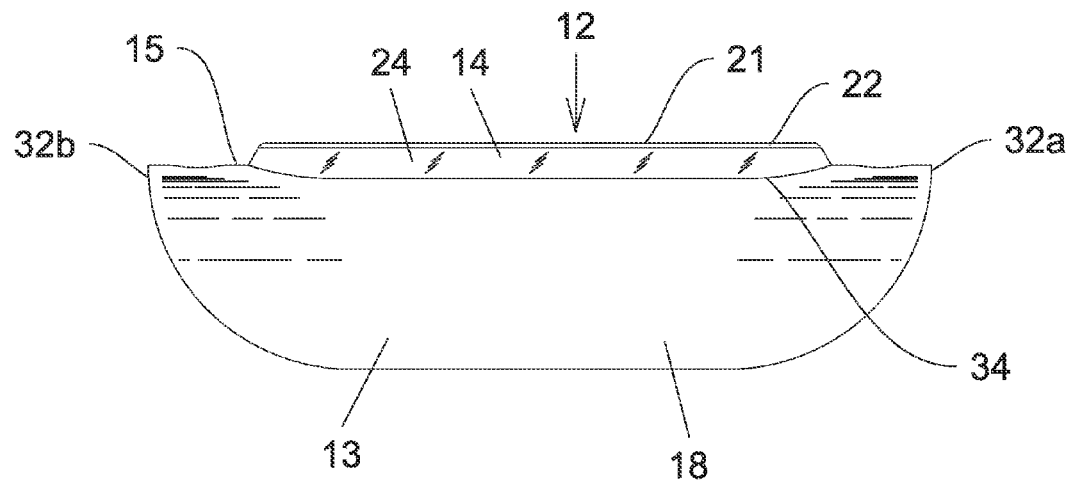
FIG. 9 is a front elevational view of the housing assembly of FIG. 3.
Figure 10:
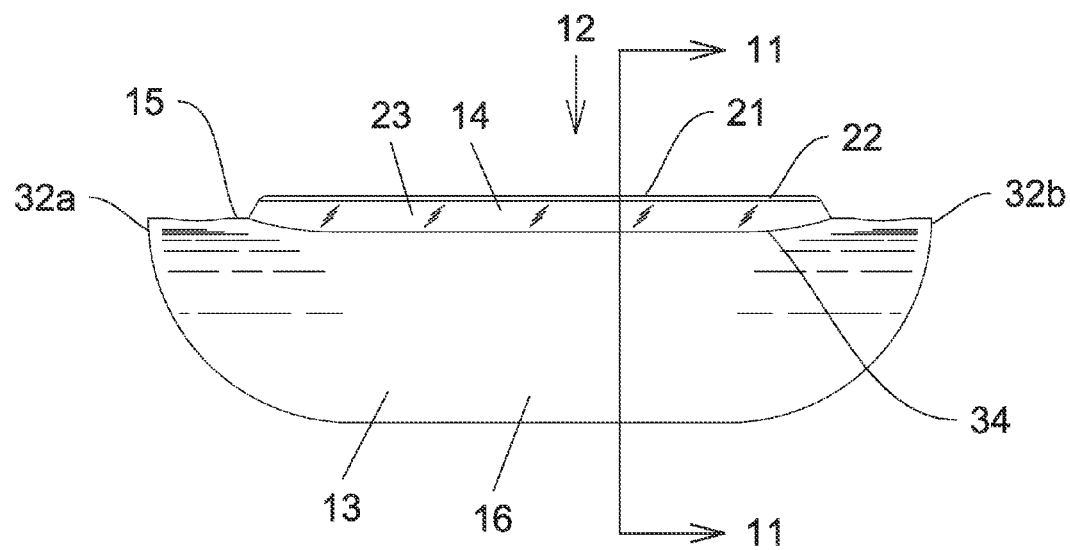
FIG. 10 is a rear elevational view of the housing assembly of FIG. 3.

FIG. 9 is a front elevational view housing assembly 12 and FIG. 10 is a rear elevational view of housing assembly 12.

Figure 11:
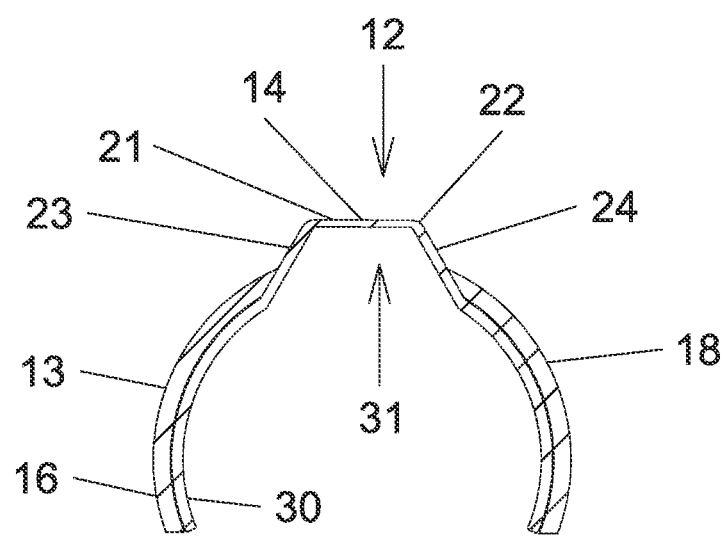
FIG. 11 is a cross-sectional view of the housing assembly taken generally along the line 11-11 of FIG. 10.

FIG. 11 is a cross-sectional view of housing assembly 12 taken generally along the line 11-11 of FIG. 10. FIG. 11 clearly depicts space 31 formed by 21 ridge of lens 14.

In an embodiment, housing 13 is made of metal, such as stainless steel, brass, aluminum, etc. It is advantageous for the housing to be made of a corrosion resistant material, such as stainless steel, and, more particularly, SAE grade 316 stainless steel. Stainless steel has advantages over other metals in that it does not readily corrode, rust, or stain. SAE grade 316 stainless steel is a marine grade stainless steel and the second most common austenite stainless steel. It is especially advantageous in marine environments and surgical applications due to its greater resistance to pitting corrosion. Lens 14 is made of a transparent or translucent material, such as plastic, glass, etc. However, it should be appreciated that the housing and lens can be made of any suitable material known in the art. The diameter of the lens is in the preferred range of ⅞ inch to 3 inches. However, it should be apparent that the lens and housing may vary in size, shape, and dimensions.

In another embodiment, housing assembly 12 has housing 13 and lens 14. However, unlike other embodiments, lens 14 is integral with housing 13 to forma single piece. Bottom surface 29 of housing 13 rests upon top surface 27 of lens 14, and lens 14 is integral with housing 13 such that lens 14 and housing 13 form a single unit.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A housing assembly for an electronic display, comprising:
a housing having a top surface, a bottom surface, a rim, and an opening, wherein the opening is bounded by the rim and at least a portion of the housing is convexly-shaped; and,
a lens having a top surface, a bottom surface, and a ridge, wherein the ridge is integral with and extends upwardly from the top surface of the lens forming a space, the bottom surface of the housing rests upon the top surface of the lens, and the housing matingly engages the lens such that the ridge of the lens protrudes upwardly through the opening of the housing therebetween and at least a portion of the lens is convexly-shaped.

2. The housing assembly of Claim 1, wherein the bottom surface of the lens is secured to a tubular-shaped member.

3. The housing assembly of claim 2, wherein the bottom surface of the lens is removably secured to the tubular-shaped member via a silicone sealant.

4. The housing assembly of claim 2, further comprising at least one electronic display disposed within the space formed by the ridge of the lens.

5. The housing assembly of claim 2, further comprising at least one light-emitting diode (LED) disposed within the space formed by the ridge of the lens.

6. The housing assembly of claim 1, wherein the housing is made of metal.

7. The housing assembly of claim 6, wherein the housing is made of stainless steel.

8. The housing assembly of claim 1, wherein the lens is made of a transparent material.

9. The housing assembly of claim 1, wherein the lens is made of a translucent material.

10. The housing assembly of claim 1, wherein the lens is made of plastic.

11. The housing assembly of claim 1, wherein the lens is made of glass.

12. The housing assembly as recited in claim 1, wherein the diameter of the lens is in the range of ⅞ inch to 3 inches.

13. A housing assembly for an electronic display, comprising:
a convexly-shaped housing having a top surface, a bottom surface, a rim, and an opening, wherein the opening is bounded by the rim;
a convexly-shaped lens having a top surface, a bottom surface, and a ridge, wherein the ridge is integral with and extends upwardly from the top surface of the lens forming a space, and wherein the bottom surface of the housing rests upon the top surface of the lens, and the housing matingly engages the lens such that the ridge of the lens protrudes upwardly through the opening of the housing therebetween; and, an electronic display disposed within the space formed by the ridge of the lens.

14. The housing assembly of claim 13, wherein the electronic display comprises at least one light-emitting diode (LED).

15. The housing assembly of claim 13, wherein the bottom surface of the lens is secured to a tubular-shaped member.

16. A housing assembly for an electronic display, comprising:

a housing having a top surface, a bottom surface, a rim, and an opening, wherein the opening is bounded by the rim and at least a portion of the housing is convexly-shaped;

a lens having a top surface, a bottom surface, and a ridge, wherein the ridge is integral with and extends upwardly from the top surface of the lens forming a space, the bottom surface of the housing rests upon the top surface of the lens, and the lens is integral with the housing such that the lens and the housing form a single piece and the ridge of the lens protrudes upwardly through the opening of the housing therebetween, and at least a portion of the lens is convexly-shaped.

17. The housing assembly of Claim 16, further comprising at least one electronic display disposed within the space formed by the ridge of the lens.

18. The housing assembly of Claim 16, wherein the bottom surface of the lens is secured to a tubular-shaped member.

* * * * *